US010793013B2

(12) United States Patent
Patel

(10) Patent No.: US 10,793,013 B2
(45) Date of Patent: Oct. 6, 2020

(54) AUTOMATIC TIMER CANCELLATION FOR CHARGING VEHICLE

(71) Applicant: Toyota Motor Engineering & Manufacturing North America, Inc., Erlanger, KY (US)

(72) Inventor: Tapan V. Patel, Lakewood, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 604 days.

(21) Appl. No.: 15/418,582

(22) Filed: Jan. 27, 2017

(65) Prior Publication Data

US 2018/0215275 A1 Aug. 2, 2018

(51) Int. Cl.
*B60L 53/00* (2019.01)
*B60L 53/14* (2019.01)
*B60L 11/18* (2006.01)
*B60L 53/66* (2019.01)
*B60L 53/65* (2019.01)
*B60L 58/12* (2019.01)

(52) U.S. Cl.
CPC ........... *B60L 53/14* (2019.02); *B60L 11/1848* (2013.01); *B60L 53/65* (2019.02); *B60L 53/665* (2019.02); *B60L 58/12* (2019.02); *B60L 2240/80* (2013.01); *Y02T 10/7005* (2013.01); *Y02T 90/161* (2013.01)

(58) Field of Classification Search
None
See application file for complete search history.

(56) References Cited

U.S. PATENT DOCUMENTS

| 5,598,084 | A |  | 1/1997 | Keith |
| 5,892,346 | A | * | 4/1999 | Moroto ............... B60K 6/485 |
|  |  |  |  | 318/587 |
| 7,698,078 | B2 |  | 4/2010 | Kelty et al. |
| 8,103,391 | B2 |  | 1/2012 | Ferro et al. |
| 9,056,552 | B2 |  | 6/2015 | Muller et al. |
| 9,102,240 | B2 |  | 8/2015 | Poulsen |
| 9,156,367 | B2 |  | 10/2015 | Matsuno et al. |
| 2003/0006914 | A1 | * | 1/2003 | Todoriki ............... B60L 58/13 |
|  |  |  |  | 340/995.21 |

(Continued)

FOREIGN PATENT DOCUMENTS

WO    WO 2013123988    8/2013

*Primary Examiner* — Truc M Do
(74) *Attorney, Agent, or Firm* — Snell & Wilmer LLP

(57) ABSTRACT

A vehicle charging system includes an on-board charger for receiving electrical power from an EVSE. The system includes a memory for storing routine charging location data and a plurality of timer functions. The system includes a sensor for detecting data. The system further includes an ECU for determining whether the on-board charger is located at a routine charging location. The ECU controls the on-board charger to receive the electrical power when the on-board charger is located at a routine charging location and a current time of day is within the time of day defined by the timer function and controls the on-board charger to receive the electrical power when the on-board charger is located at a non-routine charging location regardless of the current time of day. The system includes an output device designed to output data indicating that the on-board charger is receiving the electrical power from the EVSE.

14 Claims, 5 Drawing Sheets

(56) References Cited

U.S. PATENT DOCUMENTS

| | | | |
|---|---|---|---|
| 2008/0281663 A1* | 11/2008 | Hakim | H02J 3/383 705/7.25 |
| 2010/0017249 A1* | 1/2010 | Fincham | B60L 3/12 705/412 |
| 2011/0015799 A1* | 1/2011 | Pollack | G06Q 30/0208 700/291 |
| 2011/0022222 A1* | 1/2011 | Tonegawa | B60L 8/003 700/232 |
| 2011/0130885 A1* | 6/2011 | Bowen | H02J 3/14 700/291 |
| 2011/0175569 A1* | 7/2011 | Austin | H01M 10/44 320/109 |
| 2011/0276448 A1* | 11/2011 | Perper | G06Q 30/04 705/34 |
| 2012/0007554 A1* | 1/2012 | Kanamori | H01M 10/44 320/109 |
| 2012/0041622 A1* | 2/2012 | Hermann | H01M 16/006 701/22 |
| 2012/0092141 A1* | 4/2012 | Ichihara | H04B 3/54 340/12.32 |
| 2012/0112698 A1* | 5/2012 | Yoshimura | G06Q 30/04 320/109 |
| 2012/0116575 A1* | 5/2012 | Prosser | G06Q 20/202 700/232 |
| 2012/0179323 A1* | 7/2012 | Profitt-Brown | G01C 21/3682 701/29.1 |
| 2012/0259665 A1* | 10/2012 | Pandhi | G06Q 40/00 705/4 |
| 2012/0265362 A1 | 10/2012 | Yasko | |
| 2012/0271547 A1* | 10/2012 | Mori | G08G 1/20 701/527 |
| 2012/0280804 A1* | 11/2012 | Matsumoto | B60L 53/14 340/425.5 |
| 2013/0024306 A1* | 1/2013 | Shah | B60L 53/665 705/17 |
| 2013/0088198 A1* | 4/2013 | Masuda | H02J 7/041 320/109 |
| 2013/0110296 A1* | 5/2013 | Khoo | B60L 53/60 700/286 |
| 2013/0184886 A1* | 7/2013 | Pollack | G05D 11/00 700/291 |
| 2014/0062401 A1* | 3/2014 | Gadh | B60L 11/1838 320/109 |
| 2014/0077762 A1 | 3/2014 | Spanos | |
| 2014/0347018 A1 | 11/2014 | Boblett et al. | |
| 2015/0224888 A1* | 8/2015 | Wild | G06Q 30/0639 705/26.9 |
| 2015/0298565 A1* | 10/2015 | Iwamura | G01C 21/3476 701/22 |
| 2015/0298569 A1 | 10/2015 | Kosetsu | |
| 2016/0129800 A1 | 5/2016 | Mauter | |
| 2016/0229305 A1* | 8/2016 | Shumaker | G06F 21/34 |

\* cited by examiner

FIG. 5

| ROUTINE CHARGING LOCATION | TIMER FUNCTION | ROUTINE CHARGING LOCATION DATA | | | | | |
|---|---|---|---|---|---|---|---|
| | | LOCATION | VOLTAGE | CURRENT | PILOT SIGNAL | PAYMENT | AMBIENT LIGHT |
| HOME | 11PM - 5AM | HOME GPS | 120V | 30 AMP | 5V, 1KHZ, 25% DC | NO | 15% |
| WORK | 10PM - 5AM | WORK GPS | 120V | 40 AMP | 5V, 1.5KHZ, 50% DC | YES | 75% |

AUTOMATIC TIMER CANCELLATION FOR CHARGING VEHICLE

BACKGROUND

Field

The present disclosure relates to systems and methods for controlling charging of a vehicle battery and, more particularly, to systems and methods for controlling charging of a vehicle battery based on detected data corresponding to locations of vehicle chargers.

Description of the Related Art

Electric and hybrid vehicles are becoming more popular as time goes on. Recently, plug-in hybrid vehicles have also increased in popularity. Both electric vehicles and plug-in hybrid vehicles are designed to connect to an electric vehicle supply equipment (EVSE) in order to receive electrical power for charging the vehicle battery.

The cost of electricity typically varies based on time of day. For example, electricity is typically more expensive during peak demand times (usually during the daytime) and less expensive during relatively low demand times (usually at nighttime). Accordingly, many vehicles are designed to charge the vehicle battery based on a timer function that is programmed to receive electricity when the cost is relatively low. Thus, the timer functions of many vehicles are programmed such that the vehicles receive electricity at nighttime rather than daytime to provide more efficient charging.

In some vehicles, the timer function may operate regardless of whether the vehicle is located at a routine charging location or a non-routine charging location. However, situations can be envisioned in which it is desirable to receive electricity during the daytime. For example, if a vehicle is being driven on a road trip, the battery may have a relatively low state of charge (SOC) after a first leg of the road trip. If this occurs during the daytime, it is desirable to recharge the battery so the vehicle may be further driven without waiting until nighttime. In that regard, if a vehicle connects to an EVSE at a non-routine charging location then the driver may be required to cancel the timer function in order to receive the charge during the daytime.

Thus, there is a need for systems and methods for automatic cancellation of timer functions for various plug-in hybrid and electric vehicles.

SUMMARY

Described herein is a vehicle charging system. The vehicle charging system includes an on-board charger designed to receive electrical power from an electric vehicle supply equipment (EVSE). The vehicle charging system also includes a memory designed to store routine charging location data corresponding to routine charging locations and a plurality of timer functions each corresponding to a time of day during which the on-board charger should receive the electrical power from a corresponding routine charging location. The vehicle charging system further includes a sensor designed to detect data corresponding to an environment of the sensor. The vehicle charging system further includes an electronic control unit (ECU) coupled to the on-board charger, the memory, and the sensor. The ECU is designed to determine whether the on-board charger is located at one of the routine charging locations by comparing the detected data corresponding to the environment of the sensor to the stored routine charging location data when the on-board charger is coupled to the EVSE. The ECU is further designed to control the on-board charger to receive the electrical power from the EVSE when the on-board charger is located at the one of the routine charging locations and a current time of day is within the time of day during which the on-board charger should receive the electrical power. The ECU is further designed to control the on-board charger to receive the electrical power from the EVSE when the on-board charger is located at a non-routine charging location regardless of the current time of day. The vehicle charging system further includes an output device coupled to the ECU and designed to output data indicating that the on-board charger is receiving the electrical power from the EVSE regardless of the current time of day when the on-board charger is located at the non-routine charging location.

Also described is a vehicle charging system. The vehicle charging system includes an on-board charger designed to receive electrical power from an electric vehicle supply equipment (EVSE). The vehicle charging system also includes a memory designed to store routine charging location data corresponding to routine charging locations and a plurality of timer functions each corresponding to a time of day during which the on-board charger should receive the electrical power from a corresponding routine charging location. The vehicle charging system also includes a sensor designed to detect data corresponding to an environment of the sensor. The sensor may include one or more of a location sensor designed to detect a current location of the on-board charger, a voltage sensor designed to detect a voltage level of the electrical power, a current sensor designed to detect a current level of the electrical power, a signal sensor configured to detect a voltage, a frequency, and a duty cycle of a pilot signal received from the EVSE, a light sensor designed to detect an amount of ambient light, or a payment sensor configured to detect whether payment is required to receive the electrical power. The vehicle charging system further includes an electronic control unit (ECU) coupled to the on-board charger, the memory, and the sensor. The ECU is designed to determine whether the on-board charger is located at one of the routine charging locations by comparing the detected data corresponding to the environment of the sensor to the stored routine charging location data when the on-board charger is coupled to the EVSE. The ECU is further designed to control the on-board charger to receive the electrical power from the EVSE when the on-board charger is located at the one of the routine charging locations and a current time of day is within the time of day during which the on-board charger should receive the electrical power. The ECU is further designed to control the on-board charger to receive the electrical power from the EVSE when the on-board charger is located at a non-routine charging location regardless of the current time of day.

Also described is a method for charging a vehicle. The method includes storing, in a memory, routine charging location data corresponding to routine charging locations and a plurality of timer functions each corresponding to a time of day during which an on-board charger should receive electrical power from a corresponding routine charging location. The method also includes detecting, by a sensor, data corresponding to an environment of the sensor. The method also includes determining, by an electronic control unit (ECU), whether the on-board charger is located at one of the routine charging locations by comparing the detected data corresponding to the environment of the sensor to the stored routine charging location data when the on-board charger is coupled to an electric vehicle supply equipment (EVSE). The method also includes controlling, by the ECU, the on-board charger to receive the electrical power from the EVSE when the on-board charger is located at the one of the routine charging locations and a current time of day is within the time of day during which the on-board charger should receive the electrical power. The method also includes controlling, by the ECU, the on-board charger to receive the electrical power from the EVSE when the on-board charger is located at a non-routine charging location regardless of the current time of day.

BRIEF DESCRIPTION OF THE DRAWINGS

The features, obstacles, and advantages of the present invention will become more apparent from the detailed description set forth below when taken in conjunction with the drawings, wherein:

FIG. 5 is a drawing of an exemplary chart illustrating data stored in a memory of the plug-in hybrid vehicle of FIG. 1 according to an embodiment of the present invention.

DETAILED DESCRIPTION

The present disclosure is directed to systems and methods for controlling charging of a vehicle battery. An exemplary system includes a chargeable battery and an on-board charger coupled to the battery and designed to transfer electricity from an electric vehicle supply equipment (EVSE) to the battery. The system also includes one or more sensor, such as a location sensor, a light sensor, or a signal sensor, that is designed to detect data usable to identify an external source of electricity. The system also includes an electronic control unit (ECU) that is designed to control charging of the battery based on the data detected by the sensor. If the ECU determines that the vehicle is at a routine charging location based on the detected data then the ECU may control the on-board charger to receive the external electricity based on a stored timer function. The timer function may indicate times during which electricity is relatively inexpensive such that the battery can be charged during the times of relatively inexpensive electricity. If the ECU determines that the vehicle is at a non-routine charging location based on the detected data then the ECU may control the on-board charger to receive the external electricity regardless of a current time of day.

The systems described herein provide benefits and advantages such as allowing and EVSE to charge a vehicle at a non-routine charging location by simply connecting the EVSE to the charge port of the vehicle. This advantageously reduces the likelihood of a driver connecting the vehicle to an EVSE and forgetting to initiate the charge by canceling a timer function. The system also advantageously informs a driver when immediate vehicle charging begins and giving the driver an option to cancel the immediate vehicle charging so that the user can avoid paying relatively high electricity costs. The systems described herein further advantageously charge the vehicle battery until the state of charge (SOC) reaches or exceeds a predetermined SOC threshold regardless of other factors, providing the benefit of ensuring that the vehicle will have a sufficient amount of power in case of an emergency. The systems described herein provide the additional advantage of transmitting a message to a device of a driver indicating that the vehicle is not connected to an EVSE during a time of day in which the vehicle typically receives charge to ensure that the driver remembers to connect the vehicle to an EVSE.

Figure 1:
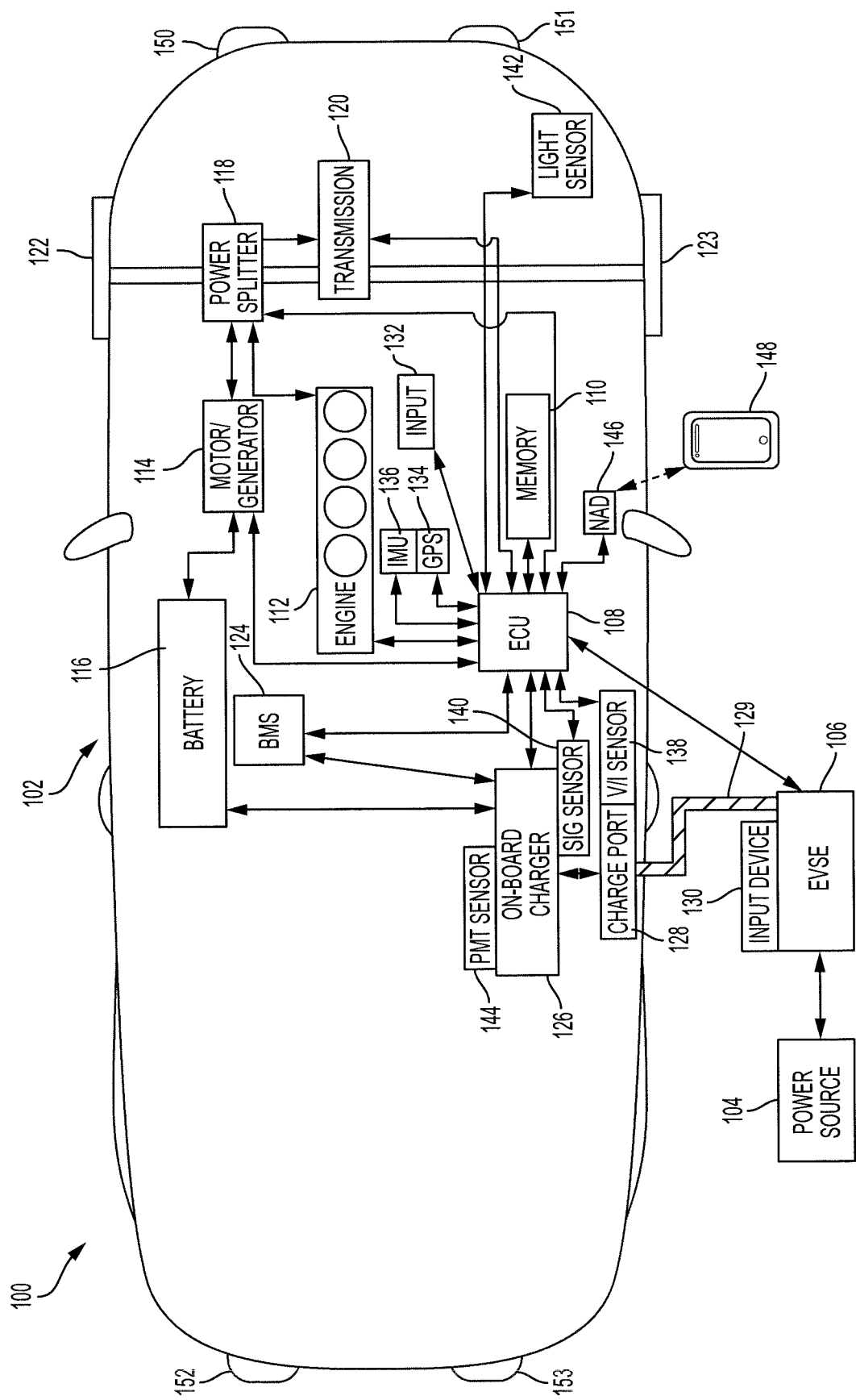
FIG. 1 is a block diagram of a plug-in hybrid vehicle designed to control transfer of electricity from an electric vehicle supply equipment (EVSE) to a battery of the plug-in hybrid vehicle based on data detected by one or more sensor of the plug-in hybrid vehicle according to an embodiment of the present invention.

Turning to FIG. 1, a vehicle charging system is designed to control electric charging of a vehicle battery. The vehicle charging system 100 may include components from one or more of a vehicle 102, a power source 104, or an EVSE 106. The power source 104 may include any power source capable of providing electricity, such as a wall outlet or industrial power supply. The EVSE 106 is coupled to the power source 104 and transfers electrical power from the power source 104 to the vehicle 102 for charging a battery 116 of the vehicle 102.

The vehicle 102 may include an ECU 108, a memory 110, an engine 112, a motor-generator 114, the battery 116, a power splitter 118, and a transmission 120. Although the vehicle 102 is shown to be a plug-in hybrid vehicle, one skilled in the art will realize that the present disclosure applies to any other vehicle configuration that includes a battery that receives charge from an external EVSE without departing from the scope of the invention.

The ECU 108 can include one or more processors or controllers, which may be specifically designed for automotive systems. The functions of the ECU 108 can be implemented in a single ECU or in multiple ECUs. The ECU 108 may receive data from components of the vehicle 102, may make determinations based on the received data, and may control the operation of components based on the determinations.

The memory 110 may include any non-transitory memory known in the art. In that regard, the memory 110 may store machine-readable instructions usable by the ECU 108 and may store any other data as requested by the ECU 108.

The engine 112 converts fuel into mechanical power. In that regard, the engine 112 may be a gasoline engine, a diesel engine, a fuel cell engine or the like.

The battery 116 stores electrical energy. The motor-generator 114 converts the electrical energy stored in the battery 116 to mechanical power. The motor-generator 114 may also convert received mechanical power into electrical energy, which may then be stored in the battery 116.

The power splitter 118 may be coupled to the engine 112 and the motor-generator 114. The power splitter 118 may transfer mechanical power received from the motor-generator 114 and/or the engine 112 to the transmission 120. In some embodiments, the power splitter 118 may control how much mechanical power is transferred to the transmission 120 from each of the motor-generator 114 and the engine 112. For example, the ECU 108 may control the power splitter 118 to achieve a desired power transfer from each of the motor-generator 114 and the engine 112 to the transmission 120.

The transmission 120 may be coupled to two or more wheels 122, 123. In that regard, the transmission 120 may transfer power received from the power splitter 118 to the wheels 122, 123.

A battery management system (BMS) 124 may be coupled to the battery 116. The BMS 124 may measure, using battery sensors (not shown), parameters used to determine the SOC and the current temperature of the battery 116. The SOC may be a percentage or a ratio relative to another predetermined value associated with the battery 116 and may correspond to a level of energy stored in the battery 116.

An on-board charger 126 is coupled to the battery 116 and is designed to transfer energy to the battery 116 to increase the SOC of the battery 116.

The vehicle 102 further includes a charge port 128 that can be coupled to, and receive power from, the EVSE 106. For example, a cable 129 may be connected between the charge port 128 and the EVSE 106. In some embodiments, the charge port 128 may receive power from the EVSE wirelessly. The on-board charger 126 is electrically coupled to the charge port 128 such that power can be received by the on-board charger 126 from the charge port 128.

The EVSE 106 may include an input device 130. In some embodiments, the EVSE 106 may transfer electrical power to the charge port 128 based on input received via the input device 130.

The vehicle 102 may further include an input device 132. For example, the input device 132 may include a button, a touchscreen, or the like. In some embodiments, the ECU 108 may control the on-board charger 126 to receive electrical power from the EVSE 106 based on user input received from the input device 132.

In some embodiments, the ECU 108 may control the on-board charger 126 to receive electrical power from the EVSE 106 based on data stored in the memory 110 and/or based on data detected by one or more sensors of the vehicle 102. In particular, the sensors of the vehicle 102 may include one or more of a global positioning system (GPS) sensor 134, an inertial measurement unit (IMU) sensor 136, a voltage and/or current sensor 138, a signal sensor 140, a light sensor 142, and a payment sensor 144.

The GPS sensor 134 may be capable of detecting location data corresponding to a location of the vehicle 102. The IMU sensor 136 may detect inertial measurement data corresponding to inertial measurement of the vehicle 102. For example, the IMU sensor 136 may detect a velocity or an orientation of the vehicle 102. One or both of the GPS sensor 134 or the IMU sensor 136 may be referred to as a location sensor as they may be used to determine a current location of the vehicle 102.

The voltage and/or current sensor 138 may be positioned within the vehicle 102 at a location from which it may detect a voltage level and/or a current level of the electrical power received from the EVSE 106. For example, the voltage and/or current sensor 138 may be coupled to the charge port 128, may be positioned between the EVSE 106 and the charge port 128, maybe coupled to the on-board charger 126, or the like. In some embodiments, the voltage and/or current sensor 138 may be a component within the charge port 128 and/or the on-board charger 126, such as a circuit capable of detecting the voltage level and/or the current level of the electrical power.

The signal sensor 140 may be capable of detecting data corresponding to a pilot signal transmitted by the EVSE 106. Many EVSEs transmit a pilot signal to provide data corresponding to the particular EVSE. For example, the pilot signal may identify a maximum voltage of the electrical power, a maximum current of the electrical power, a power rating of the EVSE, or the like. The pilot signaled may provide this information based on a voltage level of the pilot signal, a frequency of the pilot signal, and/or a duty cycle of the pilot signal.

The signal sensor 140 may receive the pilot signal from the EVSE 106 and may detect one or more of the voltage level, the frequency, and the duty cycle of the pilot signal. In that regard, the voltage level and/or the current level may be determined based on the data detected by the signal sensor 140.

The signal sensor 140 may be a separate sensor or may be included within the charge port 128 and/or the on-board charger 126. For example, the signal sensor 140 may include one or more digital or analog logic device, potentially fabricated on a chip, and capable of detecting and analyzing one or more of the voltage level, the frequency, and the duty cycle of the pilot signal.

The light sensor 142 may be capable of detecting an amount of ambient light in the environment of the vehicle 102. The light sensor 142 may thus be used, based on a current time of day, to detect the presence of sunlight. The ECU may use the detected amount of ambient light to determine whether the vehicle 102 is parked outdoors or indoors.

Various EVSEs may require payment prior to receiving electrical power from the EVSE 106. In that regard, the payment sensor 144 may detect or determine whether payment is required to use any given EVSE. In some embodiments, the EVSE 106 may transmit a signal to the charge port 128 and/or the on-board charger 126 indicating whether payment is required. In that regard, the payment sensor 144 may include one or more analog or digital logic device capable of analyzing signals from the EVSE 106 to determine whether payment is required.

The vehicle 102 may further include a network access device 146. The network access device 146 may include any port or device capable of communicating via a wired or wireless interface. For example, the ECU 108 may control the network access device 146 to communicate with an external device 148, such as a cell phone of a driver, via a Bluetooth® protocol, a Wi-Fi protocol, a cellular protocol, or the like. The network access device 146 may be considered an output device as it may transmit data to the external device 148 which may be received by a user of the external device 148.

The vehicle 102 may further include a plurality of light sources including forward lights 150, 151 on or near a front of the vehicle 102 and rear lights 152, 153 on or near a rear of the vehicle 102. The ECU 108 may control the forward lights 150, 151 and the rear lights 152, 153 to generate light. The light generated by the forward lights 150, 151 and the rear lights 152, 153 may indicate certain data to a user of the vehicle 102 and, thus, the forward lights 150, 151 and the rear lights 152, 153 may be considered output devices.

Figure 2:
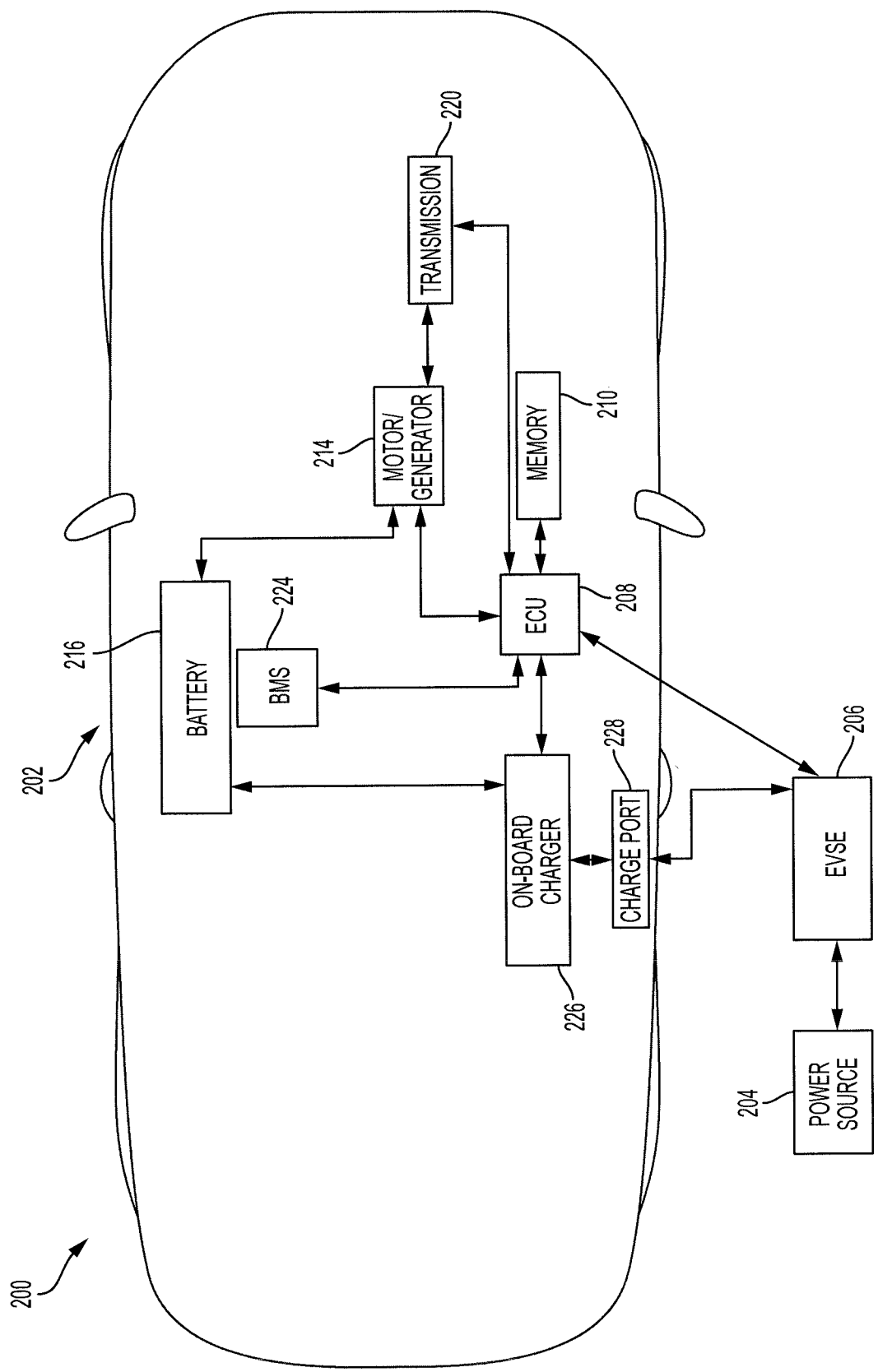
FIG. 2 is a block diagram of an electric vehicle designed to control transfer of electricity from an electric vehicle supply equipment (EVSE) to a battery of the electric vehicle based on data detected by one or more sensor of the electric vehicle according to an embodiment of the present invention.

Turning now to FIG. 2, another vehicle charging system 200 may include components of one or more of a vehicle 202, a power source 204, and an EVSE 206. The vehicle 202 may include similar components as the vehicle 102 of FIG. 1 but may be an electric vehicle instead of a plug-in hybrid vehicle. In that regard, the vehicle 202 may include an ECU 208, a memory 210, a motor-generator 214, a battery 216, and a transmission 220. Notably missing from the vehicle 202 are an engine and a power splitter. In that regard, all mechanical power used to move the vehicle 202 may be provided by the motor-generator 214 directly to the transmission 220.

As with the vehicle 102, the vehicle 202 may include a BMS 224, an on-board charger 226, and a charge port 228. The vehicle 202 may further include various sensors (not shown) such as any of the sensors of the vehicle 102 of FIG. 1.

Figure 3:
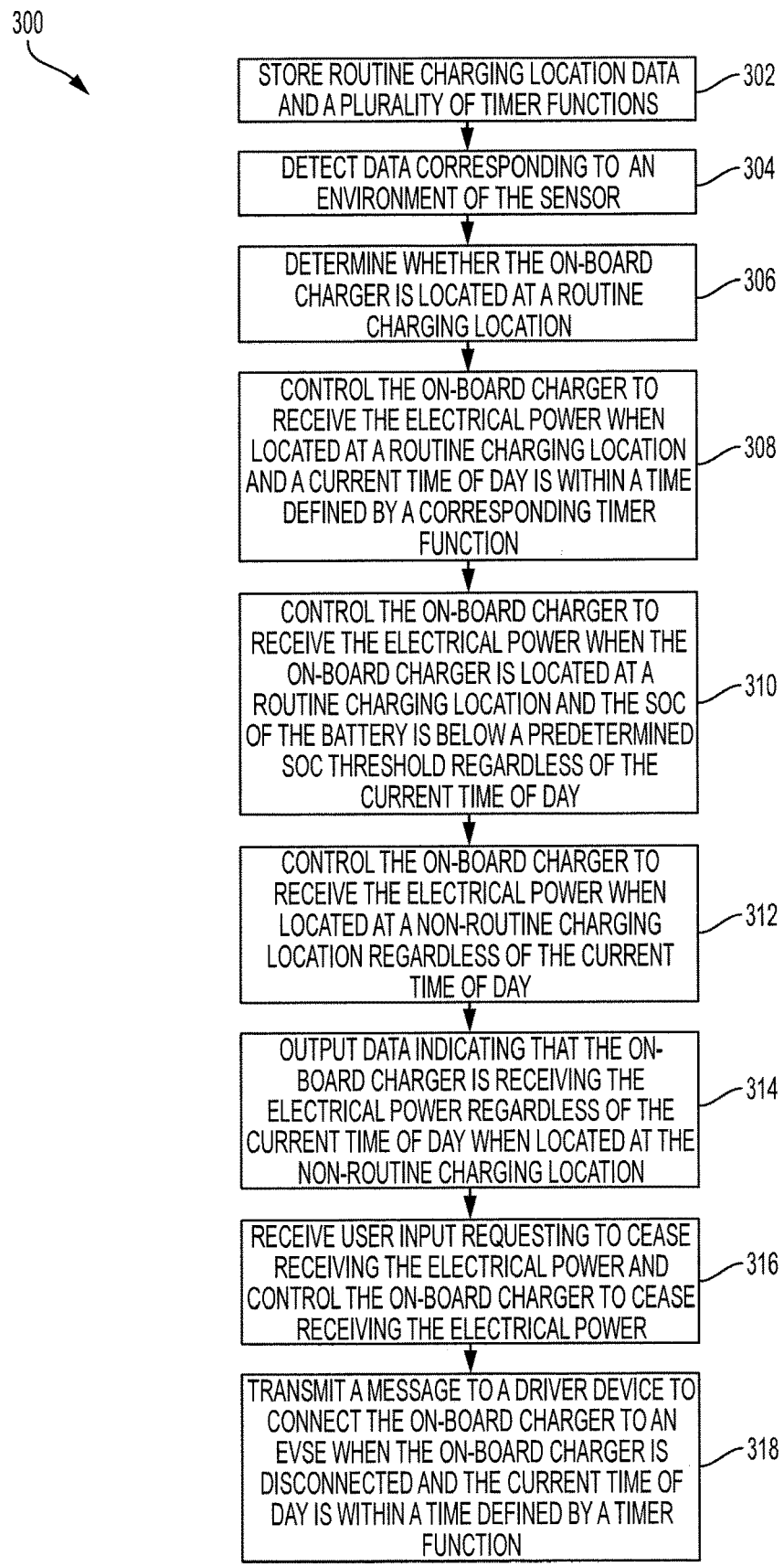
FIG. 3 is a flowchart illustrating a method for controlling transfer of electricity from an electric vehicle supply equipment (EVSE) to a battery of a vehicle according to an embodiment of the present invention.
Figure 4:
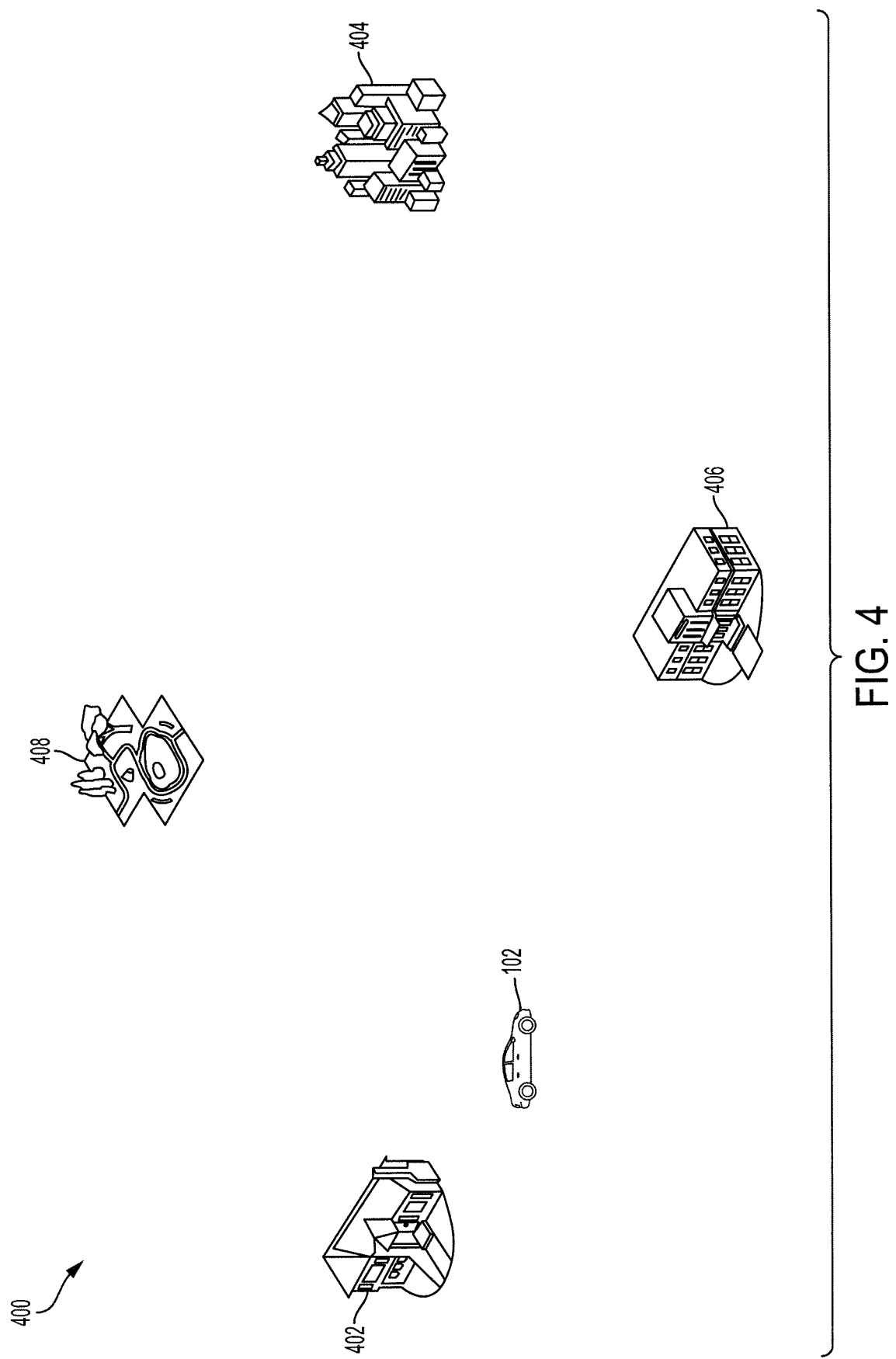
FIG. 4 is a drawing of a map illustrating an exemplary use of the method of FIG. 3A according to an embodiment of the present invention.

Referring to FIGS. 1 and 3, a method 300 for controlling charging of the vehicle 102 is shown. The method 300 may also be used to control charging of any other vehicle, such as the vehicle 202 of FIG. 2. In some embodiments, some or all blocks of the method 300 may be performed at any time and, in some embodiments, some or all blocks of the method 300 may be performed when the vehicle 102 is coupled to an EVSE such that electrical power may be received from the EVSE. In that regard, the method 300 may be initiated at any time and/or may be initiated when the vehicle 102 is coupled to an EVSE.

In block 302, routine charging location data and a plurality of timer functions may be stored in the memory 110. Routine charging locations may correspond to locations at which the vehicle 102 is often connected to an EVSE. In some embodiments, a routine charging location may be defined as a location for which a timer function is stored.

A timer function corresponds to a time of day during which the ECU 108 will control the on-board charger 126 to receive power from the corresponding EVSE. In various embodiments, the time of day may include a range of times during which electrical power is relatively inexpensive.

Routine charging location data may include data usable by the ECU 108 to identify a routine charging location. The ECU 108 may receive data from one or more sensors of the vehicle 102 and may compare the data to the routine charging location data to determine whether the vehicle 102 is positioned at one of the routine charging locations.

With brief reference to FIG. 5, an exemplary chart 500 illustrates various routine charging locations and corresponding timer functions and routine charging location data. A $1^{st}$ routine charging location, home 402, has a timer function indicating that the vehicle 102 will receive electrical power between the times of 11 PM and 5 AM. Multiple routine charging location data corresponding to the home 402 is also stored in the chart 500. For example, the routine charging location data includes home GPS coordinates, data indicating that the electrical power received from the home EVSE is provided at 120 volts (V) and 30 amps (A), that the pilot signal is a 5 V signal with a frequency of 1 kilohertz (kHz) and a duty cycle of 25%, that payment is not required to receive the electrical power, and that the ambient light during daylight hours is 15% indicating that the vehicle 102 is parked inside of a structure at the home 402.

Returning reference to FIGS. 1 and 3 and in some embodiments, the memory 110 may be programmed to have a single timer function for all routine charging locations. In that regard, the ECU 108 may control the on-board charger 126 to receive power during the time of day corresponding to the single timer function when the vehicle 102 is located at any routine charging location.

In block 304, one or more sensor of the vehicle 102 may detect data corresponding to an environment of the sensor. For example, the GPS sensor 134 and the IMU sensor 136 may detect a current location of the vehicle 102, the voltage and/or current sensor 138 may detect a voltage level and/or a current level of the electrical power, the signal sensor 140 may detect data corresponding to the pilot signal, the light sensor 142 may detect an amount of ambient light, and/or the payment sensor 144 may detect whether payment is required to receive the electrical power.

In block 306, the ECU 108 may determine whether the vehicle 102 is located at a routine charging location or a non-routine charging location. For example, the ECU 108 may compare the data detected by the sensor(s) in block 304 to the routine charging location data stored in the memory 110. If the detected data matches the routine charging location data of any of the routine charging locations then the ECU 108 may determine that the vehicle 102 is located at a routine charging location. If the detected data does not match the routine charging location data of any of the routine charging locations than the ECU 108 may determine that the vehicle 102 is located at a non-routine charging location.

In some embodiments, if multiple sensors detect data, it may be unnecessary for all detected data to match the routine charging location data in order for the ECU 108 to determine that the vehicle 102 is located at a routine charging location. Various metrics may be used to determine whether the vehicle 102 is located at a routine charging location when not all of the detected data matches the routine charging location data. For example, if a predetermined percentage, such as at least 50 percent (%) or 75%, of detected data matches the routine charging location data for a routine charging location then the ECU 108 may determine that the vehicle 102 is located at the corresponding routine charging location.

As another example, the detected data may be weighted such that some of the detected data is determined to be more important than other detected data. For example, the detected data may be weighted from most important to least important as follows. The most important data may include the current location of the vehicle 102 as detected by one or both of the GPS sensor 134 and the IMU sensor 136. The next most important data may include one or both of the voltage level and the current level of the electrical power as detected by the voltage and/or current sensor 138. The next most important data may include at least one of the voltage, the frequency, or the duty cycle of the pilot signal as detected by the signal sensor 140. The next most important data may include whether payment is required to receive the electrical power as detected by the payment sensor 144. The least important data may include the detected amount of ambient light as detected by the light sensor 142. Continuing the example, the ECU 108 may determine that the vehicle 102 is located at a routine charging location if the most important detected data matches the routine charging location data, if the two most important items of detected data match the routine charging location data, if two of the top three most important items of detected data match the routine charging location data, or the like.

In block 308, if the vehicle 102 is located at a routine charging location, the ECU 108 may control the on-board charger 126 to receive the electrical power during the time of day defined by the corresponding timer function.

With brief reference to FIGS. 1 and 5, the vehicle 102 may be coupled to the EVSE 106 of the home 402. The ECU 108 may cause the on-board charger 126 to receive the electrical power from the EVSE 106 when a current time of day is between 11 PM and 5 AM. In some embodiments, the ECU 108 may cause the on-board charger 126 to receive the electrical power until the SOC of the battery 116 is approximately 100% (i.e., between 85% and 100%). In some embodiments, the ECU 108 may cause the on-board charger 126 to receive the electrical power until the SOC of the battery 116 is approximately 100% regardless of the time of day as long as the on-board charger 126 begins receiving the electrical power between 11 PM and 5 AM. In some embodiments, the ECU 108 may cause the on-board charger 126 to stop receiving the electrical power when the current time of day reaches 5 AM regardless of the current SOC of the battery 116.

Returning reference to FIGS. 1 and 3, it may be desirable for the SOC of the battery 116 to always remain above a predetermined SOC threshold whenever possible. For example, the predetermined threshold may correspond to an amount of SOC required for the vehicle 102 to travel a predetermined distance such as 5 miles, 10 miles, 20 miles, or the like. By causing the SOC of the battery 116 to remain above the predetermined SOC threshold, a driver can be confident that he may use the vehicle 102 in the case of an emergency regardless of the current time of day. For example, the predetermined SOC threshold may be sufficiently great that the vehicle 102 may be driven to the nearest hospital and back to the original location. The predetermined SOC threshold may be set by the driver using the input device 132 or may be pre-programmed into the ECU 108 by the vehicle manufacturer.

In block 310, the ECU 108 may control the on-board charger 126 to receive electrical power until the SOC of the battery 116 reaches or exceeds the predetermined SOC threshold. The ECU 108 may do so if the vehicle 102 is located at a routine charging location and the current SOC of the battery 116 is less than the predetermined SOC threshold regardless of a current time of day. In that regard, the driver can be fairly certain that the vehicle 102 may be driven in case of an emergency regardless of the current time of day.

In block 312, if the vehicle 102 is located at a non-routine charging location then the ECU 108 may control the on-board charger 126 to receive the electrical power regardless of a current time of day. By controlling the on-board charger 126 to receive the electrical power regardless of a current time of day, a driver of the vehicle may be sure that the battery 116 is charged by simply connecting the on-board charger 126 to the EVSE of the non-routine charging location. Accordingly, it is unnecessary for a driver to cancel a timer function in order to receive electrical power at a non-routine charging location.

It may be desirable for a driver to receive a notification when charging begins at a non-routine charging location due to the fact that charging may begin immediately. In that regard, the ECU 108 may control an output device to output data indicating that the on-board charger is receiving the electrical power regardless of the time of day when the vehicle is located at the non-routine charging location. It may be desirable for the output device to be located external to the vehicle 102. This is because the user may connect the charge port 128 to the EVSE 106 while the user is outside of the vehicle 102 and then may proceed to a location away from the vehicle 102.

In some embodiments, the ECU 108 may control the forward lights 150, 151 and/or the rear lights 152, 153 to generate light to indicate that the on-board charger 126 is receiving the electrical power. For example, the forward lights 150, 151 and/or the rear lights 152, 153 may turn on and off in a predetermined pattern to indicate that the on-board charger 126 is receiving the electrical power.

In some embodiments, the ECU 108 may control the network access device 146 to transmit a message to the external device 148 associated with the driver. The message may indicate that the on-board charger 126 is receiving the electrical power.

In some embodiments, the driver may not wish to receive the electrical power at the current time. In that regard, the user may provide input requesting that the on-board charger 126 cease receiving the electrical power from the EVSE 106. The input may be received via the input device 132. In some embodiments, the input may be received from the external device 148 via the network access device 146. In that regard, the network access device 146 may be considered an input device.

In block 316, if the received user input indicates a request to cease receiving the electrical power, the ECU 108 may control the on-board charger 126 to stop receiving the electrical power.

In some situations, a driver may leave the vehicle 102 at a non-routine charging location for a relatively long period of time. For example, if the driver is on vacation or on a business trip, the driver may leave the vehicle 102 at a hotel overnight. Occasionally, the driver may inadvertently forget to connect the vehicle 102 to an EVSE. The driver may then wake up the next morning to find that the battery 116 has a relatively low SOC.

In order to reduce the likelihood of the situation occurring, the ECU 108 may transmit a message to the external device 148 to inform the driver that the vehicle 102 is not connected to an EVSE in block 318. In some embodiments, the ECU may transmit the message to the external device when the on-board charger is not connected to an EVSE and the current time of day is within a time defined by a timer function. In that regard, if the driver is away from a routine charging location during a time defined by one or more timer function then the driver may be reminded via the message from the network access device 146 to charge the battery 116.

In some embodiments, the message of block 318 may be sent when the current time is within any time defined by any timer function stored in the memory 110. In some embodiments, the ECU 108 may be aware of the home location of the vehicle 102 and the message may be sent when the current time is within a time defined by a timer function that corresponds to the home location of the vehicle 102.

Turning now to FIGS. 1, 3, 4, and 5, an exemplary use of the method 300 by the vehicle 102 is shown. A map 400 illustrates various locations to which the vehicle 102 may travel. The home 402 and a work location 404 may be routine charging locations, and a hotel 406 and a park 408 may be non-routine charging locations that each includes an EVSE.

When the vehicle 102 is connected to an EVSE of any of the locations, the ECU 108 may determine whether the location is a routine charging location or a non-routine charging location. For example, the ECU 108 may receive data detected by one or more of the sensors of the vehicle 102 and compare the detected data to the routine charging location data stored in the chart 500. If the detected data matches some or all of the routine charging location data of any routine charging location as described above, the ECU 108 may determine that the vehicle 102 is located at the corresponding routine charging location. Otherwise, the ECU 108 may determine that the vehicle 102 is located at a non-routine charging location.

When the vehicle 102 is connected to an EVSE at the home 402 or the work location 404, the ECU 108 may control the on-board charger 126 to receive electrical power during the times defined by the timer function. For example, at the work location 404, the ECU 108 may control the on-board charger 126 to receive electrical power between 10 PM and 5 AM.

If the vehicle 102 is located at the home 402 or the work location 404 and the SOC of the battery 116 is below the predetermined SOC threshold, then the ECU 108 may control the on-board charger 126 to receive the electrical power until the SOC of the battery 116 reaches or exceeds the predetermined SOC threshold, regardless of a time of day.

If the vehicle 102 is located at the park 408 and the on-board charger 126 is connected to a corresponding EVSE then the ECU 108 may control the on-board charger 126 to immediately receive electrical power. The ECU 108 may also control one or more of the forward lights 150, 151 or the rear lights 152, 153 to output data indicating that the on-board charger 126 is receiving the electrical power. The ECU 108 may also or instead control the network access device 146 to transmit a message to the external device 148 of the driver indicating that the on-board charger 126 is receiving the electrical power.

After a period of time, the driver it may go on vacation and park the car at the hotel 406. One night while on vacation, the driver may forget to connect the vehicle 102 to the corresponding EVSE. When the time of day reaches 11 PM, corresponding to the beginning of the time described by the timer function of the home 402, the ECU 108 may control the network access device 146 to transmit a message to the external device 148 of the driver reminding the driver to plug in the vehicle 102 to the EVSE.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle charging system comprising:
    an on-board charger configured to receive electrical power from an electric vehicle supply equipment (EVSE);
    a memory configured to store routine charging location data corresponding to routine charging locations and a plurality of timer functions each corresponding to a time of day during which the on-board charger should receive the electrical power from a corresponding routine charging location;
    a sensor configured to detect data corresponding to an environment of the sensor;
    an output device including a network access device configured to transmit a message to a device associated with a vehicle driver; and
    an electronic control unit (ECU) coupled to the on-board charger, the memory, and the sensor and configured to:
        determine whether the on-board charger is located at one of the routine charging locations by comparing the detected data corresponding to the environment of the sensor to the stored routine charging location data when the on-board charger is coupled to the EVSE,
        control the on-board charger to receive the electrical power from the EVSE when the on-board charger is located at the one of the routine charging locations and a current time of day is within the time of day during which the on-board charger should receive the electrical power,
        control the on-board charger to receive the electrical power from the EVSE when the on-board charger is located at a non-routine charging location regardless of the current time of day,
        control the output device to output data indicating that the on-board charger is receiving the electrical power from the EVSE regardless of the current time of day when the on-board charger is located at the non-routine charging location, and
        control the output device to transmit a message to a device associated with a vehicle driver to connect the on-board charger to the EVSE when the on-board charger is located at the non-routine charging location, the on-board charger is disconnected from the EVSE, and the current time of day is within the time of day during which the on-board charger should receive the electrical power from at least one routine charging location.

2. The vehicle charging system of claim 1 further comprising at least one of a plurality of sensors configured to detect a corresponding factor, the plurality of sensors and the corresponding factor including:
    a location sensor configured to detect a current location of the on-board charger;
    a voltage sensor configured to detect a voltage level of the electrical power;
    a current sensor configured to detect a current level of the electrical power;
    a signal sensor configured to detect a voltage, a frequency, or a duty cycle of a pilot signal received from the EVSE;
    a light sensor configured to detect an amount of ambient light; or
    a payment sensor configured to detect whether payment is required to receive the electrical power.

3. The vehicle charging system of claim 2 wherein the corresponding factor of each of the sensors is weighted from most important to least important as follows:
    the current location of the on-board charger;
    at least one of the voltage level of the electrical power or the current level of the electrical power;
    at least one of the voltage, the frequency, or the duty cycle of the pilot signal received from the EVSE;
    whether the payment is required to receive the electrical power; and
    the amount of ambient light.

4. The vehicle charging system of claim 1 further comprising an input device coupled to the ECU and configured to receive user input corresponding to a request to cease receiving the electrical power from the EVSE, wherein the ECU is further configured to control the on-board charger to stop receiving the electrical power when the user input corresponds to the request to cease receiving the electrical power regardless of the current time of day or whether the on-board charger is located at the one of the routine charging locations or the non-routine charging location.

5. The vehicle charging system of claim 1 further comprising a battery coupled to the on-board charger and configured to receive the electrical power from the on-board charger, wherein the ECU is further configured to:
    determine a state of charge (SOC) of the battery;
    control the on-board charger to receive the electrical power from the EVSE when the on-board charger is located at the one of the routine charging locations and the SOC of the battery is below a predetermined SOC threshold regardless of the time of day; and continue to control the on-board charger to receive the electrical power until the SOC of the battery reaches or exceeds the predetermined SOC threshold.

6. A vehicle charging system comprising:

an on-board charger configured to receive electrical power from an electric vehicle supply equipment (EVSE);

a memory configured to store routine charging location data corresponding to routine charging locations and a plurality of timer functions each corresponding to a time of day during which the on-board charger should receive the electrical power from a corresponding routine charging location;

a sensor configured to detect data corresponding to an environment of the sensor, the sensor including at least one of:

a location sensor configured to detect a current location of the on-board charger, a voltage sensor configured to detect a voltage level of the electrical power, a current sensor configured to detect a current level of the electrical power, a signal sensor configured to detect a voltage, a frequency, and a duty cycle of a pilot signal received from the EVSE, a light sensor configured to detect an amount of ambient light, or a payment sensor configured to detect whether payment is required to receive the electrical power;

an output device including a network access device configured to transmit a message to a device associated with a driver; and an electronic control unit (ECU) coupled to the on-board charger, the memory, and the sensor and configured to:

determine whether the on-board charger is located at one of the routine charging locations by comparing the detected data corresponding to the environment of the sensor to the stored routine charging location data when the on-board charger is coupled to the EVSE, control the on-board charger to receive the electrical power from the EVSE when the on-board charger is located at the one of the routine charging locations and a current time of day is within the time of day during which the on-board charger should receive the electrical power, control the on-board charger to receive the electrical power from the EVSE when the on-board charger is located at a non-routine charging location regardless of the current time of day, control the output device to output data indicating that the on-board charger is receiving the electrical power from the EVSE regardless of the current time of day when the on-board charger is located at the non-routine charging location, and control the output device to transmit a message to a device associated with a vehicle driver to connect the on-board charger to the EVSE when the on-board charger is located at the non-routine charging location, the on-board charger is disconnected from the EVSE, and the current time of day is within the time of day during which the on-board charger should receive the electrical power from at least one routine charging location.

7. The vehicle charging system of claim 6 wherein the detected data corresponding to the environment of the sensor is weighted from most important to least important as follows:

the current location of the on-board charger;

at least one of the voltage level of the electrical power or the current level of the electrical power;

at least one of the voltage, the frequency, or the duty cycle of the pilot signal received from the EVSE;

whether the payment is required to receive the electrical power; and the amount of ambient light.

8. The vehicle charging system of claim 6 further comprising an input device coupled to the ECU and configured to receive user input corresponding to a request to cease receiving the electrical power from the EVSE, wherein the ECU is further configured to control the on-board charger to stop receiving the electrical power when the user input corresponds to the request to cease receiving the electrical power regardless of the current time of day or whether the on-board charger is located at the one of the routine charging locations or the non-routine charging location.

9. The vehicle charging system of claim 6 further comprising a battery coupled to the on-board charger and configured to receive the electrical power from the on-board charger, wherein the ECU is further configured to:

determine a state of charge (SOC) of the battery;

control the on-board charger to receive the electrical power from the EVSE when the on-board charger is located at the one of the routine charging locations and the SOC of the battery is below a predetermined SOC threshold regardless of the time of day; and continue to control the on-board charger to receive the electrical power until the SOC of the battery reaches or exceeds the predetermined SOC threshold.

10. A method for charging a vehicle comprising:

storing, in a memory, routine charging location data corresponding to routine charging locations and a plurality of timer functions each corresponding to a time of day during which an on-board charger should receive electrical power from a corresponding routine charging location;

detecting, by a sensor, data corresponding to an environment of the sensor;

determining, by an electronic control unit (ECU), whether the on-board charger is located at one of the routine charging locations by comparing the detected data corresponding to the environment of the sensor to the stored routine charging location data when the on-board charger is coupled to an electric vehicle supply equipment (EVSE);

controlling, by the ECU, the on-board charger to receive the electrical power from the EVSE when the on-board charger is located at the one of the routine charging locations and a current time of day is within the time of day during which the on-board charger should receive the electrical power;

controlling, by the ECU, the on-board charger to receive the electrical power from the EVSE when the on-board charger is located at a non-routine charging location regardless of the current time of day;

controlling, by the ECU, an output device to output data indicating that the on-board charger is receiving the electrical power from the EVSE regardless of the current time of day when the on-board charger is located at the non-routine charging location; and controlling, by the ECU, the output device to transmit a message to a device associated with a vehicle driver to connect the on-board charger to the EVSE when the on-board charger is located at the non-routine charging location, the on-board charger is disconnected from the EVSE, and the current time of day is within the time of day during which the on-board charger should receive the electrical power from at least one routine charging location.

11. The method of claim 10 wherein detecting, by the sensor, the data corresponding to the environment of the sensor includes at least one of:
detecting, by a location sensor, a current location of the on-board charger;
detecting, by a voltage sensor, a voltage level of the electrical power,
detecting, by a current sensor, a current level of the electrical power;
detecting, by a signal sensor, a voltage, a frequency, and a duty cycle of a pilot signal received from the EVSE;
detecting, by a light sensor, an amount of ambient light; or
detecting, by a payment sensor, whether payment is required to receive the electrical power.

12. The method of claim 11 wherein the data corresponding to the environment of the sensor is weighted from most important to least important as follows:
the current location of the on-board charger;
at least one of the voltage level of the electrical power or the current level of the electrical power;
at least one of the voltage, the frequency, or the duty cycle of the pilot signal received from the EVSE;
whether the payment is required to receive the electrical power; and
the amount of ambient light.

13. The method of claim 10 further comprising:
receiving, by an input device, user input corresponding to a request to cease receiving the electrical power from the EVSE; and
controlling, by the ECU, the on-board charger to stop receiving the electrical power when the user input corresponds to the request to cease receiving the electrical power regardless of the current time of day or whether the on-board charger is located at the one of the routine charging locations or the non-routine charging location.

14. The method of claim 10 further comprising:
receiving, by a battery, the electrical power from the on-board charger;
determining, by the ECU, a state of charge (SOC) of the battery;
controlling, by the ECU, the on-board charger to receive the electrical power from the EVSE when the on-board charger is located at the one of the routine charging locations and the SOC of the battery is below a predetermined SOC threshold regardless of the time of day; and
continue controlling, by the ECU, the on-board charger to receive the electrical power until the SOC of the battery reaches or exceeds the predetermined SOC threshold.

* * * * *